US009893540B2

(12) United States Patent
Zhang et al.

(10) Patent No.: US 9,893,540 B2
(45) Date of Patent: Feb. 13, 2018

(54) POWER ADAPTER, ELECTRONIC DEVICE, AND CHARGING APPARATUS FOR ELECTRONIC DEVICE

(71) Applicant: GUANGDONG OPPO MOBILE TELECOMMUNICATIONS CORP., LTD., Dongguan (CN)

(72) Inventors: Jialiang Zhang, Dongguan (CN); Fuchun Liao, Dongguan (CN); Yuanxiang Hu, Dongguan (CN); Kewei Wu, Dongguan (CN); Jun Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/596,009

(22) Filed: May 16, 2017

(65) Prior Publication Data
US 2017/0250557 A1  Aug. 31, 2017

Related U.S. Application Data

(63) Continuation of application No. 15/113,973, filed as application No. PCT/CN2014/077284 on May 12, 2014.

(30) Foreign Application Priority Data

Jan. 28, 2014 (CN) .......................... 2014 1 0043062

(51) Int. Cl.
*H02J 7/00* (2006.01)
*H02J 7/02* (2016.01)
*H02J 7/04* (2006.01)

(52) U.S. Cl.
CPC .......... *H02J 7/0029* (2013.01); *H02J 7/0004* (2013.01); *H02J 7/027* (2013.01); *H02J 7/042* (2013.01);
(Continued)

(58) Field of Classification Search
CPC ........ H02J 7/0029; H02J 7/042; H02J 7/0004; H02J 7/027; H02J 7/0036; H02J 7/0034;
(Continued)

(56) References Cited

U.S. PATENT DOCUMENTS

2002/0175654 A1  11/2002 Takano et al.
2004/0090209 A1  5/2004 Nishida et al.
(Continued)

FOREIGN PATENT DOCUMENTS

CN        1801570 A    7/2006
CN     101123365 A    2/2008
(Continued)

OTHER PUBLICATIONS

The Australian Patent Office, Examination Report No. 1 for 2014381131, dated Sep. 12, 2017, 8 pages.

Primary Examiner — Edward Tso
Assistant Examiner — Manuel Hernandez
(74) Attorney, Agent, or Firm — Hodgson Russ LLP

(57) ABSTRACT

The present disclosure provides a power adapter, an electronic device and a charging apparatus for an electronic device. In the process of charging a battery in a conventional charge mode after the power adapter is powered on, the power adapter carries out quick charge inquiry communication with the electronic device when an output current value of the power adapter is within a conventional current range for a preset time interval; after the electronic device sends a quick charge command to the power adapter, the power adapter adjusts the output voltage according to the
(Continued)

battery voltage information fed back by the electronic device; and when the output voltage meets a voltage requirement for quick charge preset by the electronic device, the power adapter adjusts the output current and the output voltage for charging the battery in a quick charge mode.

16 Claims, 4 Drawing Sheets

(52) U.S. Cl.
CPC ........... *H02J 7/0034* (2013.01); *H02J 7/0036* (2013.01); *H02J 7/045* (2013.01); *H02J 2007/0095* (2013.01); *H02J 2007/0096* (2013.01)

(58) Field of Classification Search
CPC ............... H02J 7/045; H02J 2007/0096; H02J 2007/0095
USPC ......................................................... 320/137
See application file for complete search history.

(56) References Cited

U.S. PATENT DOCUMENTS

| | | |
|---|---|---|
| 2004/0164714 A1 | 8/2004 | Hayashi |
| 2004/0189253 A1 | 9/2004 | Tanabe et al. |
| 2005/0007069 A1* | 1/2005 | Murakami ............... H02J 7/022 320/111 |
| 2008/0315846 A1 | 12/2008 | Sato et al. |
| 2011/0115442 A1 | 5/2011 | Garrastacho et al. |
| 2011/0248670 A1 | 10/2011 | Yamazaki et al. |
| 2012/0326656 A1* | 12/2012 | Ikeda .................... H02J 7/0054 320/107 |
| 2014/0055084 A1* | 2/2014 | Ishikawa ............... H02J 7/0032 320/107 |
| 2014/0313794 A1* | 10/2014 | Ono .................. H02M 3/33523 363/21.15 |
| 2015/0263638 A1* | 9/2015 | Yang ....................... H02M 7/04 363/125 |
| 2016/0241016 A1* | 8/2016 | Rana ..................... H02H 3/006 |
| 2016/0308452 A1* | 10/2016 | Motoki ............. H02M 3/33523 |
| 2016/0336761 A1* | 11/2016 | Hsu ....................... H02J 7/0029 |
| 2016/0349814 A1* | 12/2016 | Carpenter, Jr. ......... G06F 1/266 |

FOREIGN PATENT DOCUMENTS

| | | |
|---|---|---|
| CN | 101938160 A | 1/2011 |
| CN | 103178595 A | 6/2013 |
| CN | 203135543 U | 8/2013 |
| CN | 203747485 U | 7/2014 |
| JP | 2002044878 A | 2/2002 |
| WO | 99/17418 A1 | 4/1999 |

* cited by examiner

POWER ADAPTER, ELECTRONIC DEVICE, AND CHARGING APPARATUS FOR ELECTRONIC DEVICE

CROSS REFERENCE

This application is a continuation of U.S. national phase application Ser. No. 15/113,973, filed on Jul. 25, 2016, which is based on International Application No. PCT/CN2014/077284, filed on May 12, 2014, and claims priority to Chinese Patent Application No. 201410043062.0, titled with "charging apparatus for electronic device and power adapter for electronic device", filed on Jan. 28, 2014, the entire contents of which are incorporated herein by reference.

TECHNICAL FIELD

This disclosure relates to charging technical field, and particularly relates to a power adapter, an electronic device and a charging apparatus for an electronic device.

BACKGROUND

Currently, a battery in an electronic device is charged through a power adapter of the electronic device. A constant-voltage output is usually used by the power adapter for charging the battery. However, for a battery with large capacity, it will result in too long charging time by charging the battery with the constant-voltage output, and above mentioned charging way cannot realize quick charging for the battery and thus cannot shorten the charging time.

SUMMARY

An objective of this disclosure is to provide a power adapter to solve the problem in the related art that quick charging for the battery cannot be realized and the charging time cannot be shortened.

The present disclosure is realized as follows. A power adapter is provided. The power adapter is coupled to a communication interface of the electronic device via a communication interface thereof and charges a battery in the electronic device. The power adapter is configured to:

switch off direct current output thereof and detect an output voltage thereof, after being powered on or reset;

if the output voltage is greater than a voltage threshold, continue to judge the output voltage thereof;

if the output voltage is not greater than the voltage threshold, switch on the direct current output, set the output voltage as a conventional output voltage, and detect an output current thereof;

if the output current is within a conventional current range for a preset time period, perform a quick charge inquiry communication with the electronic device;

adjust the output voltage according to battery voltage information fed back by the electronic device, after receiving a quick charge command sent by the electronic device; and if the output voltage meets a voltage requirement for quick charge predefined by the electronic device, adjust the output voltage and the output current for outputting direct current according to a quick charge voltage value and a quick charge current value.

Another objective of this disclosure is to provide an electronic device. The electronic device comprises a communication interface, a charging control circuit and a battery. Each of the charging control circuit and the battery is coupled to a communication interface of a power adapter via the communication interface of the electronic device, such that the power adapter communicates with the charging control circuit and charges the battery. The charging control circuit is further coupled to an electrode of the battery and configured to detect a voltage of the battery. The charging control circuit is further configured to determine whether the battery meets a quick charge condition after receiving a quick charge inquiry message from the power adapter, and to feed back a quick charge command and battery voltage information to the power adapter if the battery meets the quick charge condition. The charging control circuit is further configured to receive output voltage information sent by the power adapter, to determine whether an output voltage of the power adapter meets a preset voltage requirement for quick charge according to the output voltage information, and to send a command for starting a quick charge to the power adapter if the output voltage of the power adapter meets the preset voltage requirement for quick charge.

Yet another objective of this disclosure is to provide a charging apparatus for an electronic device, in which the charging apparatus comprises a power adapter and a charging control circuit. The power adapter is coupled to a communication interface of the electronic device via a communication interface thereof and charges a battery in the electronic device. The charging control circuit is coupled to the power adapter via the communication interface of the electronic device. After the power adapter is powered on or reset, the power adapter switches off direct current output thereof and detects an output voltage thereof. If the output voltage of the power adapter is greater than a voltage threshold, the power adapter continues to judge the output voltage thereof. If the output voltage of the power adapter is not greater than the voltage threshold, the power adapter switches on the direct current output thereof, sets the output voltage thereof as a conventional output voltage, and detects an output current thereof. If the output current of the power adapter is within a conventional current range for a preset time period, the power adapter performs a quick charge inquiry communication with the charging control circuit; after the charging control circuit sends a quick charge command to the power adapter, the power adapter adjusts the output voltage thereof according to battery voltage information fed back by the charging control circuit; and if the output voltage of the power adapter meets a voltage requirement for quick charge predefined by the charging control circuit, the power adapter adjusts the output voltage and the output current thereof so as to output the direct current according to a quick charge voltage value and a quick charge current value.

DETAILED DESCRIPTION

In order to make the objectives, the technical solutions and the advantages of the present disclosure more clear, further explanations on this disclosure are given below in details with reference to figures and exemplary embodiments. It is to be understood that, the exemplary embodiments described herein are merely used to explain the disclosure, rather than to limit this disclosure.

In embodiments of the present disclosure, a power adapter is configured to be coupled to a communication interface of an electronic device via a communication interface thereof and to charge a battery in the electronic device. The power adapter is configured to switch off direct current output thereof and detect an output voltage thereof, after being powered on or reset; if the output voltage is greater than a voltage threshold, continue to judge the output voltage thereof; if the output voltage is not greater than the voltage threshold, switch on the direct current output, set the output voltage as a conventional output voltage, and detect an output current thereof; if the output current is within a conventional current range for a preset time period, perform a quick charge inquiry communication with the electronic device; adjust the output voltage according to battery voltage information fed back by the electronic device, after receiving a quick charge command sent by the electronic device; and if the output voltage meets a voltage requirement for quick charge predefined by the electronic device, adjust the output voltage and the output current for outputting direct current according to a quick charge voltage value and a quick charge current value.

Figure 1:
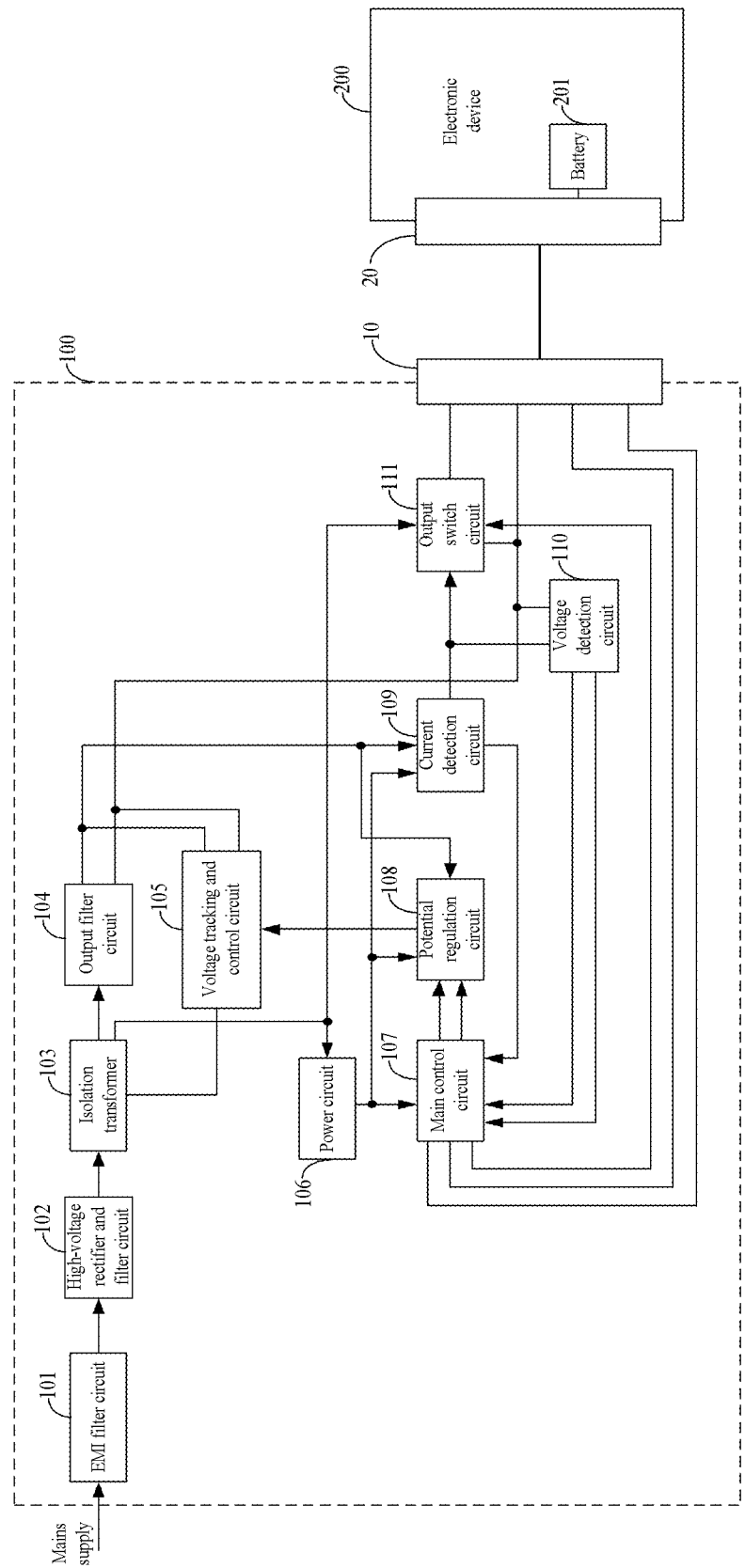
FIG. 1 is a schematic block diagram of a power adapter provided by an exemplary embodiment of this disclosure.

FIG. 1 shows a modular structure of a power adapter provided by an exemplary embodiment of this disclosure. For description, only parts related to the exemplary embodiment of this disclosure are shown, and detailed description thereof is as follows:

The power adapter 100 provided by the exemplary embodiment of this disclosure is coupled to the communication interface 20 of the electronic device 200 via the communication interface 10 thereof, and charges the battery 201 in the electronic device 200.

The power adapter 100 comprises an EMI filter circuit 101, a high-voltage rectifier and filter circuit 102, an isolation transformer 103, an output filter circuit 104 and a voltage tracking and control circuit 105. The mains supply, after the electromagnetic interference filter by the EMI filter circuit 101, is rectified and filtered by the high-voltage rectifier and filter circuit 102 to output a high-voltage direct current. The high-voltage direct current after electric isolation through the isolation transformer 103 is output to the output filter circuit 104 for filtering processing, and then charges the battery. The voltage tracking and control circuit 105 adjusts an output voltage of the isolation transformer 103 according to an output voltage of the output filter circuit 104.

The power adapter 100 further comprises a power circuit 106, a main control circuit 107, a potential regulation circuit 108, a current detection circuit 109, a voltage detection circuit 110 and an output switch circuit 111.

An input terminal of the power circuit 106 is coupled to a secondary terminal of the isolation transformer 103. A power terminal of the main control circuit 107, a power terminal of the potential regulation circuit 108, and a power terminal of the current detection circuit 109 are jointly coupled to an output terminal of the power circuit 106. A high-potential terminal of the main control circuit 107 and a high-potential terminal of the potential regulation circuit 108 are both coupled to a positive output terminal of the output filter circuit 104. A potential regulation terminal of the potential regulation circuit 108 is coupled to the voltage tracking and control circuit 105. A direct current input terminal of the current detection circuit 109 is coupled to the positive output terminal of the output filter circuit 104. A current detection feedback terminal of the current detection circuit 109 is coupled to a current detection terminal of the main control circuit 107. A clock output terminal and a data output terminal of the main control circuit 107 are coupled to a clock input terminal and a data input terminal of potential regulation circuit 108. A first detection terminal and a second detection terminal of the voltage detection circuit 110 are coupled to a direct current output terminal of the current detection circuit 109 and a negative output terminal of output filter circuit 104 respectively. A first output terminal and a second output terminal of the voltage detection circuit 110 are coupled to a first voltage detection terminal and a second voltage detection terminal of the main control circuit 107 respectively. An input terminal of the output switch circuit 111 is coupled to the direct current output terminal of the current detection circuit 109. An output terminal of the output switch circuit 111 and the negative output terminal of output filter circuit 104 are coupled with the communication interface 10. The output terminal of the output switch circuit 111 is also coupled to a third detection terminal of the voltage detection circuit 110. A ground terminal of output switch circuit 111 is coupled to the negative output terminal of the output filter circuit 104. A controlled terminal and the power terminal of the output switch circuit 111 are coupled to a switch control terminal of the main control circuit 107 and the secondary terminal of isolation transformer 103 respectively. The negative output terminal of the output filter circuit 104, the output terminal of output switch circuit 111, the first communication terminal and the second communication terminal of the main control circuit 107 are all coupled to the communication interface 10 of power adapter 100.

When the power adapter 100 is charging the battery 201 after it is powered on or reset, the main control circuit 107 controls the output switch circuit 111 to switch off a direct current output of the power adapter 100, the voltage detection circuit 110 detects an output voltage of the power adapter 100 and feeds back a voltage detection signal to main control circuit 107, and the main control circuit 107 determines whether the output voltage of the power adapter 100 is greater than a voltage threshold (e.g., 2V) according to the voltage detection signal. If the output voltage of the power adapter 100 is greater than the voltage threshold, the main control circuit 107 continues to judge the output voltage of power adapter 100; if the output voltage of the power adapter 100 is not greater than the voltage threshold, the main control circuit 107 controls the output switch circuit 111 to switch on the direct current output of the power adapter 100, and drives the voltage tracking and control circuit 105 through the potential regulation circuit 108 to set the output voltage of isolation transformer 103 as a conventional output voltage (e.g., 5.1V); the current detection circuit 109 detects an output current of the power adapter 100 and feeds back a current detection signal to the main control circuit 107. When the main control circuit 107 determines, according to the current detection signal, that the output current of the power adapter 100 is within a conventional current range for a preset time interval, the main control circuit 107 performs a quick charge inquiry communication with the electronic device 200. After the electronic device 200 sends a quick charge command to the main control circuit 107, the main control circuit 107, according to the battery voltage information fed back by electronic device 200, drives the voltage tracking and control circuit 105 through potential regulation circuit 108 to adjust the output voltage of the isolation transformer 103. If the output voltage of the power adapter 100 meets the voltage requirement for quick charge predefined by electronic device 200, the main control circuit 107 drives the voltage tracking and control circuit 105 through potential regulation circuit 108 to adjust the output voltage of isolation transformer 103, so that the power adapter 100 outputs direct current according to a quick charge current value (4 A) and a quick charge voltage value (3.4V~4.8V).

Specifically, when the power adapter 100 is charging the battery 201 after it is powered on or reset, the current detection circuit 109 continues to detect the output current of the power adapter 100 and feed back the current detection signal to the main control circuit 107 if the output current value of the power adapter 100 is less than a lower current limit (e.g., 1 A); the main control circuit 107 controls the output switch circuit 111 to switch off the direct current output of the power adapter 100 for short-circuit protection if the output current value of power adapter 100 is greater than an upper current limit (e.g., 4 A).

During the above-mentioned quick charge inquiry communication between the main control circuit 107 and the electronic device 200, the main control circuit 107 sends a quick charge inquiry command to the electronic device 200, the electronic device 200 judges whether the voltage of battery 201 reaches the quick charge voltage value according to the quick charge inquiry command, if yes, feeds back the quick charge command to the main control circuit 107, and if no, feeds back a quick charge rejecting command to the main control circuit 107.

In the above mentioned process in which the main control circuit 107, according to the battery voltage information fed back by electronic device 200, drives the voltage tracking and control circuit 105 through the potential regulation circuit 108 to adjust the output voltage of the isolation transformer 103, the main control circuit 107 sends a request for obtaining a battery voltage to the electronic device 200 according to the quick charge command sent by electronic device 200, the electronic device 200 feeds back the battery voltage information to the main control circuit 107 according to the request for obtaining the battery voltage. According to the battery voltage information, the main control circuit 107 drives the voltage tracking and control circuit 105 through the potential regulation circuit 108 to adjust the output voltage of the isolation transformer 103 to the above predefined quick charge voltage.

If the output voltage of power adapter 100 meets the voltage requirement for quick charge predefined by the electronic device 200 (i.e., falls in a rated range of quick charge voltage or equal to a rated quick charge voltage), the main control circuit 107 drives the voltage tracking and control circuit 105 through the potential regulation circuit 108 to adjust the output voltage of the isolation transformer 103 as follows, so that the power adapter 100 outputs direct current according to the quick charge current value and the quick charge voltage value.

The main control circuit 107 performs the quick charge inquiry communication with the electronic device 200. The main control circuit 107 feeds back the output voltage information to the electronic device 200; when the output voltage of power adapter 100 falls in the rated range of quick charge voltage or equals to the rated quick charge voltage, the electronic device 200 determines that the output voltage of power adapter 100 meets the voltage requirement for quick charge predefined by the electronic device 200, and feeds back a command for starting the quick charge mode to the main control circuit 107; according to the command for starting the quick charge mode, the main control circuit 107 drives the voltage tracking and control circuit 105 through the potential regulation circuit 108 to adjust the output voltage of the isolation transformer 103, so that the power adapter 100 outputs direct current according to the quick charge current value and the quick charge voltage value. Further, when the output voltage of power adapter 100 does not meet the voltage requirement for quick charge predefined by the charging control circuit 2 (i.e., falls out of the rated range of quick charge voltage or not equal to the rated quick charge voltage), the electronic device 200 sends a voltage bias feedback signal to the main control circuit 107; according to the voltage bias feedback signal, the main control circuit 107 drives the voltage tracking and control circuit 105 through the potential regulation circuit 108 to adjust the output voltage of the isolation transformer 103, and then continues to perform the quick charge inquiry communication with the electronic device 200. Specifically, the voltage bias feedback signal includes a low-voltage feedback signal and a high-voltage feedback signal. If the voltage is lower, the main control circuit 107, according to the low-voltage feedback signal, drives the voltage tracking and control circuit 105 through the potential regulation circuit 108 to raise the output voltage of the isolation transformer 103; if the voltage is higher, the main control circuit 107, according to the high-voltage feedback signal, drives the voltage tracking and control circuit 105 through the potential regulation circuit 108 to lower the output voltage of the isolation transformer 103.

Further, as mentioned above, according to the command for starting the quick charge mode, the main control circuit 107 drives the voltage tracking and control circuit 105 through the potential regulation circuit 108 to adjust the output voltage of the isolation transformer 103, so that the power adapter 100 outputs direct current according to the quick charge current value and the quick charge voltage value. The detailed process is as follows.

The main control circuit 107 drives the voltage tracking and control circuit 105 through the potential regulation circuit 108 to adjust the output voltage of the isolation transformer 103, such that the output current and the output voltage of power adapter 100 are adjusted to the quick charge current value (e.g., 4 A) and the quick charge voltage value (e.g., any value ranging from 3.4V to 4.8V) respectively. The main control circuit 107 obtains the battery voltage information from the electronic device 200, and determines, according to the voltage detection signal fed back by the voltage detection circuit 110, whether the difference between the output voltage of the power adapter 100 and the battery voltage exceeds a voltage difference threshold (e.g., 0.8V), if yes, it indicates that the line impedance between the power adapter 100 and the electronic device 200 or between the power adapter 100 and the battery 201 is abnormal, and the main control circuit 107 controls the output switch circuit 111 to switch off the direct current output of adapter 100; if no, the main control circuit 107, according to the battery voltage information, drives the voltage tracking and control circuit 105 through the potential regulation circuit 108 to adjust the output voltage of the isolation transformer 103, so as to adjust the output current of the power adapter 100, and continues to obtain the battery voltage information from the charging control circuit 300 so as to make cyclical adjustment to the output current of power adapter 100 during quick charge to the battery 201. In this way, the process of quick charge to the battery 201 can be optimized and the charging time is reduced.

Moreover, the main control circuit 107 drives the voltage tracking and control circuit 105 through the potential regulation circuit 108 to adjust the output voltage of the isolation transformer 103 so that the power adapter 100 outputs direct current according to the quick charge current value and the quick charge voltage value, meanwhile, the electronic device 200 detects the voltage of the battery 201. If the voltage of the battery 201 is greater than a quick charge voltage threshold (e.g., 4.35V), the electronic device 200 stops introducing direct current from the power adapter 100 for charging the battery 201, and feeds back a quick charge stop command to the main control circuit 107, and the main control circuit 107, according to the quick charge stop command, quits the quick charge mode and returns to the conventional charge mode.

Figure 2:
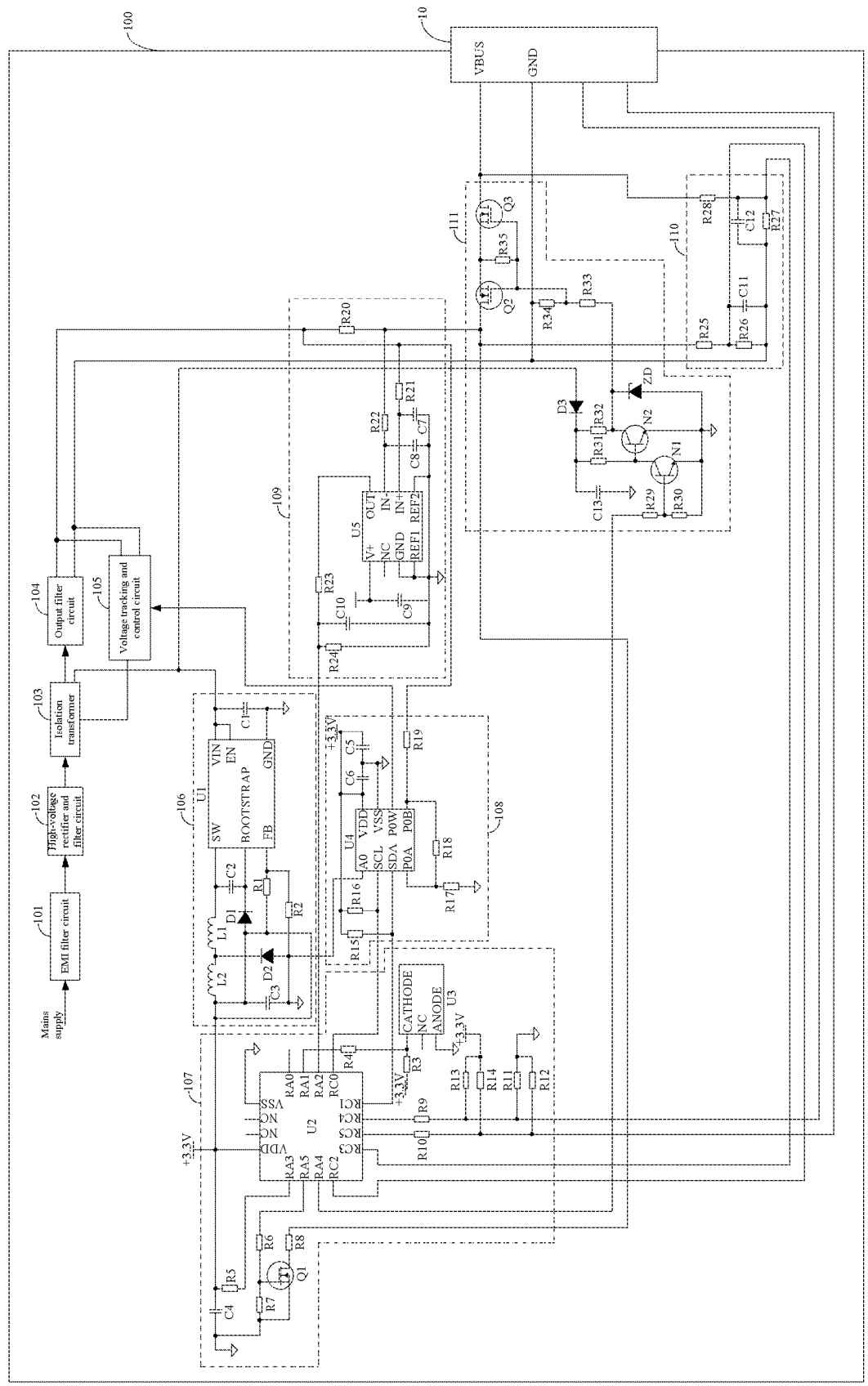
FIG. 2 shows an exemplary circuit of the power adapter shown in FIG. 1.

FIG. 2 shows an exemplary circuit of the above-mentioned power adapter 100. For description, it only shows the parts related to the exemplary embodiment of this disclosure, which is detailed as follows.

The power circuit 106 includes: a first capacitor C1, a voltage stabilizing chip U1, a second capacitor C2, a first inductor L1, a second inductor L2, a first diode D1, a second diode D2, a third capacitor C3, a first resistor R1 and a second resistor R2.

A junction of a first terminal of the first capacitor C1, and an input power pin Vin and an enable pin EN of the voltage stabilizing chip U1 is configured as the input terminal of the power circuit 106, a second terminal of the first capacitor C1 and a ground pin GND of the voltage stabilizing chip U1 are jointly grounded, a switch pin SW of the voltage stabilizing chip U1 and a first terminal of the second capacitor C2 are jointly coupled to a first terminal of first inductor L1, an internal switch pin BOOST of the voltage stabilizing chip U1 and a second terminal of the second capacitor C2 are jointly coupled to a cathode of the first diode D1, an voltage feedback pin FB of the voltage stabilizing chip U1 is coupled to a first terminal of the first resistor R1 and a first terminal of the second resistor R2, a second terminal of the first inductor L1 and a cathode of the second diode D2 are jointly coupled to a first terminal of the second inductor L2, a junction of a second terminal of the second inductor L2, an anode of the first diode D1, the second terminal of the first resistor R1 and a first terminal of the third capacitor C3 is configured as the output terminal of the power circuit 106, an anode of the second diode D2, a second terminal of the second resistor R2 and a second terminal of the third capacitor C3 are jointly grounded. Specifically, the power circuit 106 performs the voltage conversion processing on the voltage at the secondary terminal of the isolation transformer 103 by using voltage stabilizing chip U1 as the core, and outputs +3.3V voltage to the main control circuit 107, the potential regulation circuit 108 and the current detection circuit 109. The voltage stabilizing chip U1 may specifically be an MCP16301 buck DC/DC converter.

The main control circuit 107 includes: a main control chip U2, a third resistor R3, a reference voltage chip U3, a fourth resistor R4, a fifth resistor R5, a fourth capacitor C4, a sixth resistor R6, a seventh resistor R7, a first NMOS transistor Q1, an eighth resistor R8, a ninth resistor R9, a tenth resistor R10, an eleventh resistor R11, a twelfth resistor R12, a thirteenth resistor R13 and a fourteenth resistor R14.

A power pin VDD of the main control chip U3 is configured as the power terminal of the main control circuit 107, a ground pin VSS of the main control chip U3 is grounded, a first input/output pin RA0 of the main control chip U3 is suspended, a first terminal of the third resistor R3 is coupled to the power pin VDD of the main control chip U3, a second terminal of the third resistor R3 and a first terminal of the fourth resistor R4 are jointly coupled to a cathode CATHODE of the reference voltage chip U3, an anode ANODE of the reference voltage chip U3 is grounded, a vacant pin NC of the reference voltage chip U3 is suspended, a second terminal of the fourth resistor R4 is coupled to a second input/output pin RA1 of the main control chip U2, a third input/output pin RA2 of the main control chip U2 is configured as the current detection terminal of the main control circuit 107, a fourth input/output pin RA3 of the main control chip U2 is coupled to a first terminal of fifth resistor R5, a second terminal of the fifth resistor R5 and a first terminal of the fourth capacitor C4 are jointly coupled to the power pin VDD of the main control chip U2. A second terminal of the fourth capacitor C4 is grounded. A fifth input/output pin RA4 of the main control chip U2 is configured as the switch control terminal of the main control circuit 107. A sixth input/output pin RA5 of the main control chip U2 is coupled to a first terminal of the sixth resistor R6. A second terminal of the sixth resistor R6 and a gate electrode of the first NMOS transistor Q1 are jointly coupled to a first terminal of seventh resistor R7. A second terminal of the seventh resistor R7 and a source electrode of a first NMOS transistor Q1 are jointly grounded. A drain electrode of the first NMOS transistor Q1 is coupled to a first terminal of the eighth resistor R8. A second terminal of the eighth resistor R8 is configured as the high-potential terminal of the main control circuit 107. A seventh input/output pin RC0 and an eighth input/output pin RC1 of the main control chip U2 are configured as the clock output terminal and the data output terminal of the main control circuit 107 respectively. A tenth input/output pin RC3 and a ninth input/output pin RC2 of the main control chip U2 are configured as the first voltage detection terminal and the second voltage detection terminal of the main control circuit 107 respectively. An eleventh input/output pin RC4 and a twelfth input/output pin RC5 of the main control chip U2 are coupled to a first terminal of the ninth resistor R9 and a first terminal of the tenth resistor R10 respectively. A first terminal of an eleventh resistor R11 and a first terminal of the twelfth resistor R12 are coupled to a second terminal of the ninth resistor R9 and a second terminal of the tenth resistor R10 respectively. A second terminal of the eleventh resistor R11 and a second terminal of the twelfth resistor R12 are jointly grounded. A first terminal of the thirteenth resistor R13 and a first terminal of the fourteenth resistor R14 are coupled to a second terminal of the ninth resistor R9 and the second terminal of tenth resistor R10 respectively. A second terminal of the thirteenth resistor R13 and a second terminal of the fourteenth resistor R14 are jointly coupled to the power pin VDD of the main control chip U2. The second terminal of ninth resistor R9 and the second terminal of the tenth resistor R10 are configured as the first communication terminal and the second communication terminal of the main control circuit 107 respectively. In particular, the main control chip U2 may be a PIC12LF1822, PIC12F1822, PIC16LF1823 or PIC16F1823 single chip microcomputer, and reference voltage chip U3 may be an LM4040 voltage reference device.

The potential regulation circuit 108 includes: a fifteenth resistor R15, a sixteenth resistor R16, a digital potentiometer U4, a seventeenth resistor R17, an eighteenth resistor R18, a fifth capacitor C5, a sixth capacitor C6 and a nineteenth resistor R19.

A junction of a first terminal of fifteenth resistor R15, a first terminal of sixteenth resistor R16, a power pin VDD of the digital potentiometer U4 and a first terminal of the fifth capacitor C5 is configured as the power terminal of the potential regulation circuit 108. A second terminal of the fifth capacitor C5, a first terminal of the sixth capacitor C6, a ground pin VSS of the digital potentiometer U4 and a first terminal of the seventeenth resistor R17 are jointly grounded. A second terminal of the sixth capacitor C6 is coupled to the power pin VDD of the digital potentiometer U4. A junction of a second terminal of the fifteenth resistor R15 and a serial data pin SDA of the digital potentiometer U4 is configured as the data input terminal of the potential regulation circuit 108. A junction of a second terminal of the sixteenth resistor R16 and a clock input pin SCL of the digital potentiometer U4 is configured as the clock input terminal of the potential regulation circuit 108. An address zero pin A0 of the digital potentiometer U4 is grounded. A first potential wiring pin P0A of the digital potentiometer U4 and a first terminal of eighteenth resistor R18 are jointly coupled to a second terminal of the seventeenth resistor R17. A second terminal of the eighteenth resistor R18 and a second potential wiring pin P0B of the digital potentiometer U4 are jointly coupled to a first terminal of nineteenth resistor R19. A second terminal of the nineteenth resistor R19 is configured as the high-potential terminal of the potential regulation circuit 108. A potential tap pin POW of digital potentiometer U4 is configured as the potential regulation terminal of the potential regulation circuit 108. Specifically, the digital potentiometer U4 adjusts an internal slide rheostat according to the clock signal and the data signal output from the main control chip U2 so as to change the potential at the tap terminal of the internal slide rheostat (i.e., the potential tap pin POW of the digital potentiometer U4), such that the voltage tracking and control circuit 104 adjusts the output voltage of the isolation transformer 103 by following the potential change. The digital potentiometer U4 may specifically be an MCP45X1 digital potentiometer.

The current detection circuit 109 includes: a twentieth resistor R20, a twenty-first resistor R21, a twenty-second resistor R22, a seventh capacitor C7, an eighth capacitor C8, a current detection chip U5, a twenty-third resistor R23, a ninth capacitor C9, a tenth capacitor C10 and a twenty-fourth resistor R24.

A first terminal and a second terminal of twentieth resistor R20 are configured as the direct current input terminal and the direct current output terminal of current detection circuit 109 respectively, a first terminal of the twenty-first resistor R21 and a first terminal of the twenty-second resistor R22 are coupled to the first terminal and the second terminal of twentieth resistor R20 respectively, a second terminal of the twenty-first resistor R21 and a first terminal of seventh capacitor C7 are jointly coupled to a positive input pin IN+ of the current detection chip U5, a second terminal of the twenty-second resistor R22 and a first terminal of the eighth capacitor C8 are jointly coupled to a negative input pin IN− of the current detection chip U5, a junction of a power pin V+ of the current detection chip U5 and a first terminal of the ninth capacitor C9 is configured as the power terminal of the current detection circuit 109, a vacant pin NC of the current detection chip U5 is suspended, an output pin OUT of the current detection chip U5 is coupled to a first terminal of the twenty-third resistor R23, a second terminal of the twenty-third resistor R23 is configured as the current detection feedback terminal of the current detection circuit 109, a first terminal of the tenth capacitor C10 and a first terminal of the twenty-fourth resistor R24 are jointly coupled to the second terminal of the twenty-third resistor R23, a second terminal of the seventh capacitor C7, a second terminal of the eighth capacitor C8, a second terminal of the ninth capacitor C9, a second terminal of the tenth capacitor C10, a second terminal of the twenty-fourth resistor R24, and a ground pin GND, a first reference voltage pin REF1 and a second reference voltage pin REF2 of the current detection chip U5 are jointly grounded. The twentieth resistor R20, as a current detection resistor, samples the output current of the output filter circuit 104 (i.e., the output current of the power adapter 100). Then, the current detection chip U5 outputs a current detection signal to the main control chip U2 according to the voltage across two terminals of the twentieth resistor R20, in which the current detection chip U5 may specifically be an INA286 current shunt monitor.

The voltage detection circuit 110 includes: a twenty-fifth resistor R25, a twenty-sixth resistor R26, an eleventh capacitor C11, a twelfth capacitor C12, a twenty-seventh resistor R27 and a twenty-eighth resistor R28.

A first terminal of the twenty-fifth resistor R25 is configured as the first detection terminal of the voltage detection circuit 110, a junction of a second terminal of the twenty-fifth resistor R25, a first terminal of the twenty-sixth resistor R26 and a first terminal of the eleventh capacitor C11 is configured as the second output terminal of the voltage detection circuit 110, a second terminal of the twenty-sixth resistor R26 is configured as the second detection terminal of the voltage detection circuit 110, a second terminal of eleventh capacitor C11, a first terminal of the twelfth capacitor C12 and a first terminal of the twenty-seventh resistor R27 are jointly coupled to a second terminal of the twenty-sixth resistor R26, a junction of a second terminal of the twelfth capacitor C12, a second terminal of the twenty-seventh resistor R27 and a first terminal of the twenty-eighth resistor R28 is configured as the first output terminal of the voltage detection circuit 110, and a second terminal of the twenty-eighth resistor R28 is configured as the third detection terminal of voltage detection circuit 110.

The output switch circuit 111 includes: a twenty-ninth resistor R29, a thirtieth resistor R30, a thirteenth capacitor C13, a thirty-first resistor R31, a first NPN triode N1, a thirty-second resistor R32, a second NPN triode N2, a third diode D3, a voltage stabilizing diode ZD, a thirty-third resistor R33, a thirty-fourth resistor R34, a thirty-fifth resistor R35, a second NMOS transistor Q2 and a third NMOS transistor Q3.

A first terminal of the twenty-ninth resistor R29 is configured as the controlled terminal of the output switch circuit 111, a second terminal of the twenty-ninth resistor R29 and a first terminal of the thirtieth resistor R30 are jointly coupled to a base electrode of the first NPN triode N1, a first terminal of the thirteenth capacitor C13, a first terminal of the thirty-first resistor R31 and a first terminal of the thirty-second resistor R32 are jointly coupled to a cathode of the third diode D3, an anode of the third diode D3 is configured as the power terminal of the output switch circuit 111, a second terminal of the thirty-first resistor R31 and a base electrode of the second NPN triode N2 are jointly coupled to a collector electrode of the first NPN triode N1, a second terminal of the thirty-second resistor R32, a cathode of the voltage stabilizing diode ZD and a first terminal of the thirty-third resistor R33 are jointly coupled to a collector electrode of the second NPN triode N2, a second terminal of the thirtieth resistor R30, a second terminal of the thirteenth capacitor C13, an emitter electrode of the first NPN triode N1, an emitter electrode of the second NPN triode N2 and an anode of the voltage stabilizing diode ZD are jointly grounded, a second terminal of the thirty-third resistor R33, a first terminal of the thirty-fourth resistor R34, a first terminal of the thirty-fifth resistor R35, a gate electrode of the second NMOS transistor Q2 and a gate electrode of the third NMOS transistor Q3 are jointly coupled, a second terminal of thirty-fourth resistor R34 is configured as the ground terminal of output switch circuit 111, a drain electrode of the second NMOS transistor Q2 is configured as the input terminal of the output switch circuit 111, and a source electrode of the second NMOS transistor Q2 and a second terminal of the thirty-fifth resistor R35 are jointly coupled to a source electrode of the third NMOS transistor Q3, a drain electrode of third NMOS transistor Q3 is the output terminal of output switch circuit 111. Specifically, the second NMOS transistor Q2 and the third NMOS transistor Q3 are simultaneously switched on or off so as to switch on or off the direct current output of the power adapter 100.

Figure 3:
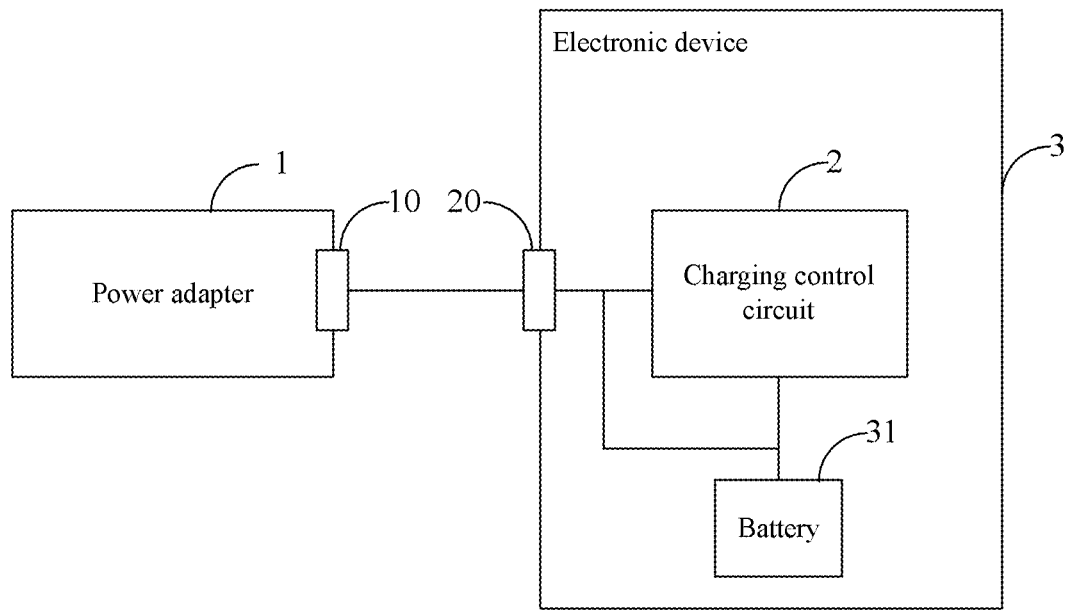
FIG. 3 is a schematic block diagram of an electronic device provided by an exemplary embodiment of this disclosure.

FIG. 3 shows a schematic block diagram of an electronic device provided by an exemplary embodiment of this disclosure. For illustration, it only shows parts related to the exemplary embodiment of this disclosure, which is detailed as follows.

The electronic device provided by the exemplary embodiment of this disclosure includes a charging control circuit 2, a communication interface 20 and a battery 31. Each of the charging control circuit 2 and the battery 31 is coupled to a communication interface 10 of a power adapter 1 via the communication interface 20, such that the power adapter 1 communicates with the charging control circuit 2 and charges the battery 31. The charging control circuit 2 is also coupled to an electrode of the battery 3 and is configured to detect the voltage of the battery 31. After receiving a quick charge inquiry message from the power adapter 1, the charging control circuit 2 determines whether the battery 31 meets a quick charge condition, and feeds back a quick charge command and battery voltage information to the power adapter 1 if the battery 31 meets the quick charge condition. Also, after receiving output voltage information sent by the power adapter 1, the charging control circuit 2 determines whether an output voltage of the power adapter 1 meets a preset voltage requirement for quick charge according to the output voltage information, and sends a command for starting a quick charge to the power adapter 1 if the output voltage of the power adapter 1 meets the preset voltage requirement for quick charge.

In at least one embodiment, the charging control circuit 2 is further configured to stop introducing direct current from the power adapter 1 and send a quick charge stop command to the power adapter 1 for switching from a quick charge mode to a convention charge mode, if the voltage of the battery 31 is greater than a quick charge voltage threshold.

Figure 4:
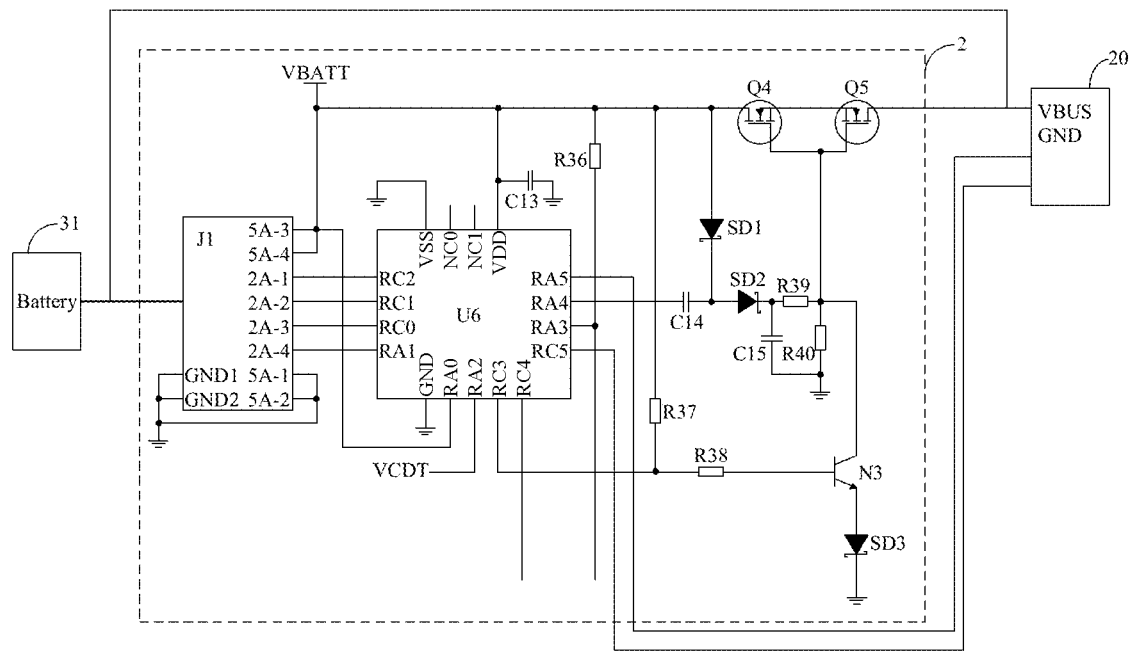
FIG. 4 shows an exemplary circuit of a charging control circuit shown in FIG. 3.

FIG. 4 shows an exemplary circuit of the above-mentioned charging control circuit 2. For illustration, it only shows parts related to the exemplary embodiment of this disclosure, which is detailed as follows.

The charging control circuit 2 includes: a battery connector J1, a main controller U6, a thirteenth capacitor C13, a thirty-sixth resistor R36, a thirty-seventh resistor R37, a fourteenth capacitor C14, a first Schottky diode SD1, a second Schottky diode SD2, a fifteenth capacitor C15, a thirty-eighth resistor R38, a thirty-ninth resistor R39, a fortieth resistor R40, a third NPN triode N3, a fourth NMOS transistor Q4 and a fifth NMOS transistor Q5.

The battery connector J1 is coupled to multiple electrodes of the battery 300, a first pin 5A-1 and a second pin 5A-2 of the battery connector J1 are jointly grounded, a first ground pin GND1 and a second ground pin GND2 of the battery connector J1 are jointly grounded, a first input/output pin RA0 of the main controller U6 is coupled to a seventh pin 5A-3 and an eighth pin 5A-4 of the battery connector J1, a second input/output pin RA1, a seventh input/output pin RC0, an eighth input/output pin RC1 and a ninth input/output pin RC2 of the main controller U6 are coupled to a sixth pin 2A-4, a fifth pin 2A-3, a fourth pin 2A-2 and a third pin 2A-1 of the battery connector J1 respectively, an analog ground pin VSS and a ground pin GND of the main controller U6 are both grounded, a first vacant pin NC0 and a second vacant pin NC1 of the main controller U6 are suspended, a power pin VDD of the main controller U6 and a first terminal of thirteenth capacitor C13 are both coupled to the seventh pin 5A-3 and the eighth pin 5A-4 of the battery connector J1, a fourth input/output pin RA3 and an eleventh input/output pin RC4 of the main controller U6 are configured to perform data communication with the electronic device, the thirty-sixth resistor R36 is coupled between the fourth input/output pin RA3 and the power pin VDD of the main controller U6, a sixth input/output pin RA5 and a twelfth input/output pin RC5 of the main controller U6 are coupled to the first communication terminal and the second communication terminal of the main control circuit 107 in power adapter 100 respectively, a first terminal of the thirty-seventh resistor R37 and a first terminal of the thirty-eighth resistor R38 are jointly coupled to a tenth input/output terminal RC3 of the main controller U6, a second terminal of the thirty-seventh resistor R37 is coupled to the power pin VDD of the main controller U6, a second terminal of the thirty-eighth resistor R38 is coupled to a base electrode of the third NPN triode N3, a fifth input/output terminal RA4 of the main controller U6 is coupled to a first terminal of the fourteenth capacitor C14, a second terminal of the fourteenth capacitor C14 and a cathode of the first Schottky diode SD1 are jointly coupled to an anode of the second Schottky diode SD2, a first terminal of the thirty-ninth resistor R39 and a first terminal of the fifteenth capacitor C15 are jointly coupled to a cathode of the second Schottky diode SD2, each of a second terminal of the thirty-ninth resistor R39, a first terminal of the fortieth resistor R40 and a collector electrode of third NPN triode N3 is coupled to a gate electrode of the fourth NMOS transistor Q4 and a gate electrode of the fifth NMOS transistor Q5, a second terminal of fortieth resistor R40 and a second terminal of the fifteenth capacitor C15 are jointly grounded, a source electrode of the fourth NMOS transistor Q4 is coupled to an anode of first Schottky diode SD1 and is also coupled to the seventh pin 5A-3 and the eighth pin 5A-4 of the battery connector J1, a drain electrode of the fourth NMOS transistor Q4 is coupled to a drain electrode of the fifth NMOS transistor Q5, a source electrode of the fifth NMOS transistor Q5 is coupled to the communication interface 20 of the electronic device 3, an emitter electrode of the third NPN triode N3 is coupled to an anode of third Schottky diode SD3, and a cathode of the third Schottky diode SD3 is grounded. The main controller U6 may specifically be a PIC12LF1501, PIC12F1501, PIC16LF1503, PIC16F1503, PIC16LF1507, PIC16F1507, PIC16LF1508, PIC16F1508, PIC16LF1509 or PIC16F1509 single chip microcomputer.

As mentioned above, the charging control circuit 2 introduces direct current from the power adapter 1 through the communication interface 20 of the electronic device 3 to charge the battery 31, which is realized as follows. The main controller U6 outputs a control signal through its fifth input/output pin RA4 for controlling the fourth NMOS transistor Q4 and the fifth NMOS transistor Q5 to switch on, and controls the third NPN triode N3 to switch off through its tenth input/output pin RC3, so as to introduce direct current from the communication interface 10 of the power adapter 1 through a data cable for charging the battery 31. As the battery 31 itself already obtains direct current from the power adapter 100 through the communication interface 20 of the electronic device 3, the direct current introduced by the charging control circuit 2 can further increase the current charging the battery 31, thus enabling the quick charge to the battery 31. In contrast, when a conventional charge is needed for battery 31, the main controller U6 controls the fourth NMOS transistor Q4 and the fifth NMOS transistor Q5 to turn off by outputting a low level through its fifth input/output pin RA4, and controls the third NPN triode N3 to turn on by outputting a high level through its tenth input/output pin RC3.

The main controller U6 performs the data communication with the electronic device through its fourth input/output Pin RA3 and eleventh input/output Pin RC4. When the electronic device is powered by the battery 31, the main controller U6 can transmit the voltage and electric quantity information of the battery 31 to the electronic device (e.g., mobile phone), and can also determine whether the quick charge process for the battery 31 has been completed according to the voltage of battery 31. If the quick charge process for the battery 31 has been completed, the main controller U6 may feed back a quick charge stop command to inform the electronic device to switch to the conventional charge mode from the quick charge mode. During the process of charging the battery 31 by the power adapter 1, if the power adapter 1 is discoupled suddenly from the battery 31, the main controller U6 detects the voltage of the battery 31 through the battery connector J1, and feeds back a charge stop command to inform the electronic device 3 to switch off the communication interface 20, so as to terminate the charge process for the battery 31. In addition, if the electronic device 3 can detect the temperature of the battery 31, the electronic device 3 may, in the case of abnormal temperature, inform the main controller U6 to switch off the fourth NMOS transistor Q4 and the fifth NMOS transistor Q5 for stopping the quick charge to the battery 31, and meanwhile the electronic device 3 may switch to the conventional charge mode from the quick charge mode.

Figure 5:
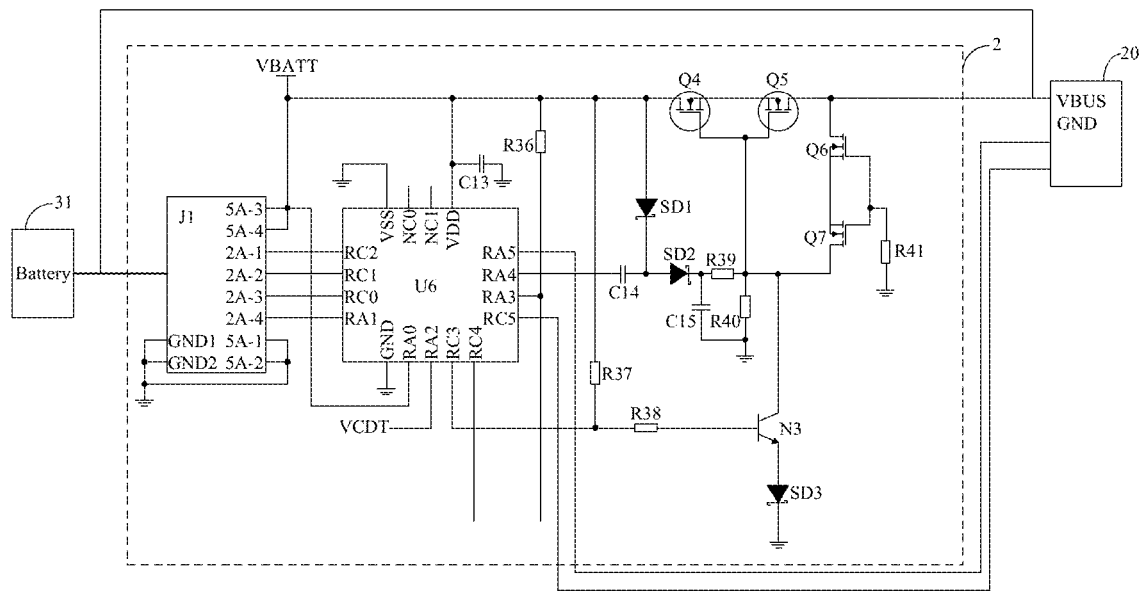
FIG. 5 shows another exemplary circuit of a charging control circuit shown in FIG. 3.

Further, during the process in which the power adapter 1 works in the quick charge mode and the charging control circuit 2 introduces direct current from the power adapter 1 to charge the battery 31, if the power line VBUS and the ground line GND of the communication interface 10 of the power adapter 1 are coupled to the ground line GND and the power line VBUS of the communication interface 20 of the electronic device 3 respectively (i.e., the power line VBUS and the ground line GND of the communication interface 10 of power adapter 1 are coupled to the ground terminal of the charging control circuit 2 and the source electrode of the fifth NMOS transistor Q5 respectively), which means that the communication interface 10 of the power adapter 1 is reversely coupled to the communication interface 20 of the electronic device 3, direct current is coupled to the ground terminal of charging control circuit 2, and the source electrode of fifth NMOS transistor Q5 is grounded. In order to prevent any damage to the components, as shown in FIG. 5, the charging control circuit 2 may further include a sixth NMOS transistor Q6, a seventh NMOS transistor Q7 and a forty-first resistor R41. A source electrode of the sixth NMOS transistor Q6 is coupled to a source electrode of the fifth NMOS transistor Q5. A drain electrode of the sixth NMOS transistor Q6 is coupled to a drain electrode of the seventh NMOS transistor Q7. A source electrode of the seventh NMOS transistor Q7 is coupled to the collector electrode of the third NPN triode N3. A gate electrode of the sixth NMOS transistor Q6 and a gate electrode of the seventh NMOS transistor Q7 are jointly coupled to a first terminal of the forty-first resistor R41. A second terminal of the forty-first resistor R41 is grounded.

In the case of the above reverse connection, the second terminal of the forty-first resistor R41 is coupled to direct current via the ground for driving the sixth NMOS transistor Q6 and the seventh NMOS transistor Q7 to switch off, which prevents the direct current that flows into the charging control circuit 2 from the ground from forming a loop, thereby protecting components in the charging control circuit 2 from any damage.

The present disclosure also provides a charging apparatus for an electronic device. The charging apparatus comprises the power adapter 1 and the charging control circuit 2 described above.

After the power adapter 1 is powered on or reset, the power adapter 1 switches off direct current output thereof and detects an output voltage thereof.

If the output voltage of the power adapter 1 is greater than a voltage threshold, the power adapter 1 continues to judge the output voltage thereof;

If the output voltage of the power adapter 1 is not greater than the voltage threshold, the power adapter 1 switches on the direct current output thereof, sets the output voltage thereof as a conventional output voltage, and detects an output current thereof.

If the output current of the power adapter 1 is within a conventional current range for a preset time period, the power adapter 1 performs a quick charge inquiry communication with the charging control circuit 2.

After the charging control circuit 2 sends a quick charge command to the power adapter 1, the power adapter 1 adjusts the output voltage thereof according to battery voltage information fed back by the charging control circuit 2.

If the output voltage of the power adapter 1 meets a voltage requirement for quick charge predefined by the charging control circuit 2, the power adapter 1 adjusts the output voltage and the output current thereof so as to output the direct current according to a quick charge voltage value and a quick charge current value.

Regarding the charging process, reference may be made to the above description described with reference to FIGS. 1-2, which will not be elaborated herein.

In summary, by adopting the power adapter including the power circuit, the main control circuit, the potential regulation circuit, the current detection circuit, the voltage detection circuit and the output switch circuit, if the output current value of the power adapter falls within the conventional current range for the preset time interval during the process in which the power adapter charges the battery in the conventional charge mode after the power adapter is powered on or reset, the power adapter performs the quick charge inquiry communication with the electronic device, and after the electronic device sends the quick charge command to the power adapter, the power adapter adjusts the output voltage according to the battery voltage information fed back by the electronic device, and if this output voltage meets the voltage requirements for quick charge predefined by the electronic device, the power adapter adjusts its output current and output voltage according to the quick charge mode for charging the battery, such that the quick charge to the battery is realized, thereby shortening the charging time.

The above descriptions are merely preferred exemplary embodiments of the disclosure, and not intended to limit the scope of the disclosure. Any modifications, equivalent substitutions and improvements made within the spirit and principles of the disclosure shall fall in the protection scope of the disclosure.

What is claimed is:

1. A power adapter, configured to be coupled to a communication interface of an electronic device via a communication interface thereof and to charge a battery in the electronic device, wherein the power adapter comprises an EMI filter circuit, a high-voltage rectifier and filter circuit, an isolation transformer, an output filter circuit, and a voltage tracking and control circuit, and the power adapter further comprises a power circuit, a main control circuit, a potential regulation circuit, a current detection circuit, a voltage detection circuit and an output switch circuit;

an input terminal of the power circuit is coupled to a secondary terminal of the isolation transformer; a power terminal of the main control circuit, a power terminal of the potential regulation circuit, and a power terminal of the current detection circuit are jointly coupled to an output terminal of the power circuit, a high-potential terminal of the main control circuit and a high-potential terminal of the potential regulation circuit are both coupled to a positive output terminal of the output filter circuit, a potential regulation terminal of the potential regulation circuit is coupled to the voltage tracking and control circuit; a direct current input terminal of the current detection circuit is coupled to a positive output terminal of the output filter circuit; a current detection feedback terminal of the current detection circuit is coupled to a current detection terminal of the main control circuit; a clock output terminal and a data output terminal of the main control circuit are coupled to a clock input terminal and a data input terminal of the potential regulation circuit; a first detection terminal and a second detection terminal of the voltage detection circuit are coupled to a direct current output terminal of the current detection circuit and a negative output terminal of the output filter circuit respectively, a first output terminal and a second output terminal of the voltage detection circuit are coupled to a first voltage detection terminal and a second voltage detection terminal of the main control circuit respectively; an input terminal of the output switch circuit is coupled to the direct current output terminal of the current detection circuit; an output terminal of the output switch circuit is coupled to a third detection terminal of the voltage detection circuit; a ground terminal of the output switch circuit is coupled to a negative output terminal of the output filter circuit; a controlled terminal and a power terminal of the output switch circuit are coupled to a switch control terminal of the main control circuit and the secondary terminal of the isolation transformer respectively; each of a negative output terminal of the output filter circuit, the output terminal of the output switch circuit, and a first communication terminal and a second communication terminal of the main control circuit is coupled to the communication interface of the power adapter; and when the power adapter is charging the battery after the power adapter is powered on or reset, the main control module controls the output switch module to switch off a direct current output of the power adapter, the voltage detection module detects the output voltage of the power adapter and feeds back a voltage detection signal to the main control module, and the main control module determines whether the output voltage of the power adapter is greater than a voltage threshold according to the voltage detection signal; if the output voltage of the power adapter is greater than the voltage threshold, the main control module continues to judge the output voltage of the power adapter; if the output voltage of the power adapter is not greater than the voltage threshold, the main control module controls the output switch module to switch on the direct current output of the power adapter, and drives the voltage tracking and control circuit through the potential regulation module to set an output voltage of the isolation transformer as a conventional output voltage; the current detection module detects the output current of the power adapter, and feeds back a current detection signal to the main control module; when the main control module determines according to the current detection signal that the output current of the power adapter is within a conventional current range for a preset time interval, the main control module performs a quick charge inquiry communication with the electronic device, and after the electronic device sends a quick charge command to the main control module, the main control module drives the voltage tracking and control circuit through the potential regulation module to adjust the output voltage of the isolation transformer, according to battery voltage information fed back by the electronic device; when the output voltage of the power adapter meets a voltage requirement for quick charge predefined by the electronic device, the main control module drives the voltage tracking and control circuit through the potential regulation module to adjust the output voltage of the isolation transformer, so that the power adapter outputs direct current according to a quick charge current value and a quick charge voltage value.

2. The power adapter of claim 1, wherein, the power circuit comprises: a first capacitor, a voltage stabilizing chip, a second capacitor, a first inductor, a second inductor, a first diode, a second diode, a third capacitor, a first resistor and a second resistor;

a junction of a first terminal of the first capacitor and an input power pin and an enable pin of the voltage stabilizing chip is configured as the input terminal of the power circuit, a second terminal of the first capacitor and a ground pin of the voltage stabilizing chip are jointly grounded; a switch pin of the voltage stabilizing chip and a first terminal of the second capacitor are jointly coupled to a first terminal of the first inductor; an internal switch pin of the voltage stabilizing chip and a second terminal of the second capacitor are jointly coupled to a cathode of the first diode; a voltage feedback pin of the voltage stabilizing chip is coupled to a first terminal of the first resistor and a first terminal of the second resistor, a second terminal of the first inductor and a cathode of the second diode are jointly coupled to a first terminal of the second inductor, a junction of a second terminal of the second inductor, an anode of the first diode, a second terminal of the first resistor and a first terminal of the third capacitor is configured as the output terminal of the power circuit; an anode of the second diode, a second terminal of the second resistor and a second terminal of the third capacitor are jointly grounded.

3. The power adapter of claim 1, wherein, the main control circuit comprises: a main control chip, a third resistor, a reference voltage chip, a fourth resistor, a fifth resistor, a fourth capacitor, a sixth resistor, a seventh resistor, a first NMOS transistor, an eighth resistor, a ninth resistor, a tenth resistor, an eleventh resistor, a twelfth resistor, a thirteenth resistor and a fourteenth resistor;

a power pin of the main control chip is configured as the power terminal of the main control circuit; a ground pin of the main control chip is grounded, a first input/output pin of the main control chip is suspended, a first terminal of the third resistor is coupled to the power pin of the main control chip, a second terminal of the third resistor and a first terminal of the fourth resistor are jointly coupled to a cathode of the reference voltage chip, an anode of the reference voltage chip is grounded, a vacant pin of the reference voltage chip is suspended; a second terminal of the fourth resistor is coupled to a second input/output pin of the main control chip; a third input/output pin of the main control chip is configured as the current detection terminal of the main control circuit; a fourth input/output pin of the main control chip is coupled to a first terminal of the fifth resistor; a second terminal of the fifth resistor and a first terminal of the fourth capacitor are jointly coupled to the power pin of the main control chip, a second terminal of the fourth capacitor is grounded; a fifth input/output pin of the main control chip is configured as the switch control terminal of the main control circuit; a sixth input/output pin of the main control chip is coupled to a first terminal of the sixth resistor; a second terminal of the sixth resistor and a gate electrode of the first NMOS transistor are jointly coupled to a first terminal of the seventh resistor; a second terminal of the seventh resistor and a source electrode of the first NMOS transistor are jointly grounded; a drain electrode of the first NMOS transistor is coupled to a first terminal of the eighth resistor; a second terminal of the eighth resistor is configured as the high-potential terminal of the main control circuit; a seventh input/output pin and an eighth input/output pin of the main control chip are configured as the clock output terminal and the data output terminal of the main control circuit respectively; a tenth input/output pin and a ninth input/output pin of the main control chip are configured as the first voltage detection terminal and the second voltage detection terminal of the main control circuit respectively; an eleventh input/output pin and a twelfth input/output pin of the main control chip are coupled to a first terminal of the ninth resistor and a first terminal of the tenth resistor respectively; a first terminal of the eleventh resistor and a first terminal of the twelfth resistor are coupled to a second terminal of the ninth resistor and a second terminal of the tenth resistor respectively; a second terminal of the eleventh resistor and a second terminal of the twelfth resistor are jointly grounded; a first terminal of the thirteenth resistor and a first terminal of the fourteenth resistor are coupled to the second terminal of the ninth resistor and the second terminal of the tenth resistor respectively; a second terminal of the thirteenth resistor and a second terminal of the fourteenth resistor are jointly coupled to the power pin of the main control chip; and the second terminal of the ninth resistor and the second terminal of the tenth resistor are configured as the first communication terminal and the second communication terminal of the main control circuit respectively.

4. The power adapter of claim 1, wherein, the potential regulation circuit comprises: a fifteenth resistor, a sixteenth resistor, a digital potentiometer, a seventeenth resistor, an eighteenth resistor, a fifth capacitor, a sixth capacitor and a nineteenth resistor;

a junction of a first terminal of the fifteenth resistor, a first terminal of the sixteenth resistor, a power pin of the digital potentiometer and a first terminal of the fifth capacitor is configured as the power terminal of the potential regulation circuit; a second terminal of the fifth capacitor, a first terminal of the sixth capacitor, a ground pin of the digital potentiometer and a first terminal of the seventeenth resistor are jointly grounded; a second terminal of the sixth capacitor is coupled to the power pin of the digital potentiometer; a junction of a second terminal of the fifteenth resistor and a serial data pin of the digital potentiometer is configured as the data input terminal of the potential regulation circuit; a junction of a second terminal of the sixteenth resistor and a clock input pin of the digital potentiometer is configured as the clock input terminal of the potential regulation circuit; an address zero pin of the digital potentiometer is grounded; a first potential wiring pin of the digital potentiometer and a first terminal of the eighteenth resistor are jointly coupled to a second terminal of the seventeenth resistor; a second terminal of the eighteenth resistor and a second potential wiring pin of the digital potentiometer are jointly coupled to a first terminal of the nineteenth resistor; a second terminal of the nineteenth resistor is configured as the high-potential terminal of the potential regulation circuit; and a potential tap pin of the digital potentiometer is configured as the potential regulation terminal of the potential regulation circuit.

5. The power adapter of claim 1, wherein, the current detection circuit comprises: a twentieth resistor, a twenty-first resistor, a twenty-second resistor, a seventh capacitor, an eighth capacitor, a current detection chip, a twenty-third resistor, a ninth capacitor, a tenth capacitor and a twenty-fourth resistor;

a first terminal and a second terminal of the twentieth resistor are configured as the direct current input terminal and the direct current output terminal of the current detection circuit respectively; a first terminal of the twenty-first resistor and a first terminal of the twenty-second resistor are coupled to a first terminal and a second terminal of the twentieth resistor respectively; a second terminal of the twenty-first resistor and a first terminal of the seventh capacitor are jointly coupled to a positive input pin of the current detection chip; a second terminal of the twenty-second resistor and a first terminal of the eighth capacitor are jointly coupled to a negative input pin of the current detection chip; a junction of a power pin of the current detection chip and a first terminal of the ninth capacitor is configured as the power terminal of the current detection circuit; a vacant pin of the current detection chip is suspended; an output pin of current detection chip is coupled to a first terminal of the twenty-third resistor; a second terminal of the twenty-third resistor is configured as the current detection feedback terminal of the current detection circuit; a first terminal of the tenth capacitor and a first terminal of the twenty-fourth resistor are jointly coupled to a second terminal of the twenty-third resistor; a second terminal of the seventh capacitor, a second terminal of the eighth capacitor, a second terminal of the ninth capacitor, a second terminal of the tenth capacitor, a second terminal of the twenty-fourth resistor, and a ground pin, a first reference voltage pin and a second reference voltage pin of the current detection chip are jointly grounded.

6. The power adapter of claim 1, wherein,
the voltage detection circuit comprises: a twenty-fifth resistor, a twenty-sixth resistor, an eleventh capacitor, a twelfth capacitor, a twenty-seventh resistor and a twenty-eighth resistor;
a first terminal of the twenty-fifth resistor is configured as the first detection terminal of the voltage detection circuit; a junction of a second terminal of the twenty-fifth resistor, a first terminal of the twenty-sixth resistor and a first terminal of the eleventh capacitor is configured as the second output terminal of the voltage detection circuit; a second terminal of the twenty-sixth resistor is configured as the second detection terminal of the voltage detection circuit; a second terminal of the eleventh capacitor, a first terminal of the twelfth capacitor and a first terminal of the twenty-seventh resistor are jointly coupled to a second terminal of the twenty-sixth resistor; a junction of a second terminal of the twelfth capacitor, a second terminal of the twenty-seventh resistor and a first terminal of the twenty-eighth resistor is configured as the first output terminal of the voltage detection circuit; and a second terminal of the twenty-eighth resistor is configured as the third detection terminal of the voltage detection circuit.

7. The power adapter of claim 1, wherein,
the output switch circuit comprises: a twenty-ninth resistor, a thirtieth resistor, a thirteenth capacitor, a thirty-first resistor, a first NPN triode, a thirty-second resistor, a second NPN triode, a third diode, a voltage stabilizing diode, a thirty-third resistor, a thirty-fourth resistor, a thirty-fifth resistor, a second NMOS transistor and a third NMOS transistor;
a first terminal of the twenty-ninth resistor is configured as the controlled terminal of the output switch circuit; a second terminal of the twenty-ninth resistor and a first terminal of the thirtieth resistor are jointly coupled to a base electrode of the first NPN triode; a first terminal of the thirteenth capacitor, a first terminal of the thirty-first resistor and a first terminal of the thirty-second resistor are jointly coupled to a cathode of the third diode; an anode of the third diode is configured as the power terminal of the output switch circuit; a second terminal of the thirty-first resistor and a base electrode of the second NPN triode are jointly coupled to a collector electrode of the first NPN triode; a second terminal of the thirty-second resistor, a cathode of the voltage stabilizing diode and a first terminal of the thirty-third resistor are jointly coupled to a collector electrode of the second NPN triode; a second terminal of the thirtieth resistor, a second terminal of the thirteenth capacitor, an emitter electrode of the first NPN triode, an emitter electrode of the second NPN triode and an anode of the voltage stabilizing diode are jointly grounded; a second terminal of the thirty-third resistor, a first terminal of the thirty-fourth resistor, a first terminal of the thirty-fifth resistor, a gate electrode of the second NMOS transistor and a gate electrode of the third NMOS transistor are jointly grounded; a second terminal of the thirty-fourth resistor is configured as the ground terminal of the output switch circuit; a drain electrode of the second NMOS transistor is configured as the input terminal of the output switch circuit; a source electrode of the second NMOS transistor and a second terminal of the thirty-fifth resistor are jointly coupled to a source electrode of the third NMOS transistor; and a drain electrode of the third NMOS transistor is configured as the output terminal of the output switch circuit.

8. A charging apparatus for an electronic device, comprising a power adapter and a charging control circuit, wherein the power adapter is configured to be coupled to a communication interface of an electronic device via a communication interface thereof and to charge a battery in the electronic device; the charging control circuit is arranged in the electronic device, and is coupled with the power adapter via the communication interface of the electronic device;
the power adapter comprises an EMI filter circuit, a high-voltage rectifier and filter circuit, an isolation transformer, an output filter circuit, and a voltage tracking and control circuit, and the power adapter further comprises a power circuit, a main control circuit, a potential regulation circuit, a current detection circuit, a voltage detection circuit and an output switch circuit;
an input terminal of the power circuit is coupled to a secondary terminal of the isolation transformer; a power terminal of the main control circuit, a power terminal of the potential regulation circuit, and a power terminal of the current detection circuit are jointly coupled to an output terminal of the power circuit, a high-potential terminal of the main control circuit and a high-potential terminal of the potential regulation circuit are both coupled to a positive output terminal of the output filter circuit, a potential regulation terminal of the potential regulation circuit is coupled to the voltage tracking and control circuit; a direct current input terminal of the current detection circuit is coupled to a positive output terminal of the output filter circuit; a current detection feedback terminal of the current detection circuit is coupled to a current detection terminal of the main control circuit; a clock output terminal and a data output terminal of the main control circuit are coupled to a clock input terminal and a data input terminal of the potential regulation circuit; a first detection terminal and a second detection terminal of the voltage detection circuit are coupled to a direct current output terminal of the current detection circuit and a negative output terminal of the output filter circuit respectively, a first output terminal and a second output terminal of the voltage detection circuit are coupled to a first voltage detection terminal and a second voltage detection terminal of the main control circuit respectively; an input terminal of the output switch circuit is coupled to the direct current output terminal of the current detection circuit; an output terminal of the output switch circuit is coupled to a third detection terminal of the voltage detection circuit; a ground terminal of the output switch circuit is coupled to a negative output terminal of the output filter circuit; a controlled terminal and a power terminal of the output switch circuit are coupled to a switch control terminal of the main control circuit and the secondary terminal of the isolation transformer respectively; each of a negative output terminal of the output filter circuit, the output terminal of the output switch circuit, and a first communication terminal and a second communication terminal of the main control circuit is coupled to the communication interface of the power adapter; and when the power adapter is charging the battery after the power adapter is powered on or reset, the main control module controls the output switch module to switch off a direct current output of the power adapter, the voltage detection module detects the output voltage of the power adapter and feeds back a voltage detection signal to the main control module, and the main control module determines whether the output voltage of the power adapter is greater than a voltage threshold according to the voltage detection signal; if the output voltage of the power adapter is greater than the voltage threshold, the main control module continues to judge the output voltage of the power adapter; if the output voltage of the power adapter is not greater than the voltage threshold, the main control module controls the output switch module to switch on the direct current output of the power adapter, and drives the voltage tracking and control circuit through the potential regulation module to set an output voltage of the isolation transformer as a conventional output voltage; the current detection module detects the output current of the power adapter, and feeds back a current detection signal to the main control module; when the main control module determines according to the current detection signal that the output current of the power adapter is within a conventional current range for a preset time interval, the main control module performs a quick charge inquiry communication with the electronic device, and after the electronic device sends a quick charge command to the main control module, the main control module drives the voltage tracking and control circuit through the potential regulation module to adjust the output voltage of the isolation transformer, according to battery voltage information fed back by the electronic device; when the output voltage of the power adapter meets a voltage requirement for quick charge predefined by the electronic device, the main control module drives the voltage tracking and control circuit through the potential regulation module to adjust the output voltage of the isolation transformer, so that the power adapter outputs direct current according to a quick charge current value and a quick charge voltage value, and the charging control circuit simultaneously introduces the direct current from the power adapter via the communication interface of the electronic device to charge the battery.

9. The electronic device of claim 8, wherein, the power circuit comprises: a first capacitor, a voltage stabilizing chip, a second capacitor, a first inductor, a second inductor, a first diode, a second diode, a third capacitor, a first resistor and a second resistor;

a junction of a first terminal of the first capacitor and an input power pin and an enable pin of the voltage stabilizing chip is configured as the input terminal of the power circuit, a second terminal of the first capacitor and a ground pin of the voltage stabilizing chip are jointly grounded; a switch pin of the voltage stabilizing chip and a first terminal of the second capacitor are jointly coupled to a first terminal of the first inductor; an internal switch pin of the voltage stabilizing chip and a second terminal of the second capacitor are jointly coupled to a cathode of the first diode; a voltage feedback pin of the voltage stabilizing chip is coupled to a first terminal of the first resistor and a first terminal of the second resistor, a second terminal of the first inductor and a cathode of the second diode are jointly coupled to a first terminal of the second inductor, a junction of a second terminal of the second inductor, an anode of the first diode, a second terminal of the first resistor and a first terminal of the third capacitor is configured as the output terminal of the power circuit; an anode of the second diode, a second terminal of the second resistor and a second terminal of the third capacitor are jointly grounded.

10. The electronic device of claim 9, wherein, the charging control circuit further comprises a sixth NMOS transistor, a seventh NMOS transistor and a forty-first resistor; a source electrode of the sixth NMOS transistor is coupled to the source electrode of the fifth NMOS transistor; a drain electrode of the sixth NMOS transistor is coupled to a drain electrode of the seventh NMOS transistor, a source electrode of the seventh NMOS transistor is coupled to the collector electrode of the third NPN triode, a gate electrode of the sixth NMOS transistor and a gate electrode of the seventh NMOS transistor are jointly coupled to a first terminal of the forty-first resistor, and a second terminal of the forty-first resistor is grounded.

11. The electronic device of claim 8, wherein, the main control circuit comprises: a main control chip, a third resistor, a reference voltage chip, a fourth resistor, a fifth resistor, a fourth capacitor, a sixth resistor, a seventh resistor, a first NMOS transistor, an eighth resistor, a ninth resistor, a tenth resistor, an eleventh resistor, a twelfth resistor, a thirteenth resistor and a fourteenth resistor;

a power pin of the main control chip is configured as the power terminal of the main control circuit; a ground pin of the main control chip is grounded, a first input/output pin of the main control chip is suspended, a first terminal of the third resistor is coupled to the power pin of the main control chip, a second terminal of the third resistor and a first terminal of the fourth resistor are jointly coupled to a cathode of the reference voltage chip, an anode of the reference voltage chip is grounded, a vacant pin of the reference voltage chip is suspended; a second terminal of the fourth resistor is coupled to a second input/output pin of the main control chip; a third input/output pin of the main control chip is configured as the current detection terminal of the main control circuit; a fourth input/output pin of the main control chip is coupled to a first terminal of the fifth resistor; a second terminal of the fifth resistor and a first terminal of the fourth capacitor are jointly coupled to the power pin of the main control chip, a second terminal of the fourth capacitor is grounded; a fifth input/output pin of the main control chip is configured as the switch control terminal of the main control circuit; a sixth input/output pin of the main control chip is coupled to a first terminal of the sixth resistor; a second terminal of the sixth resistor and a gate electrode of the first NMOS transistor are jointly coupled to a first terminal of the seventh resistor; a second terminal of the seventh resistor and a source electrode of the first NMOS transistor are jointly grounded; a drain electrode of the first NMOS transistor is coupled to a first terminal of the eighth resistor; a second terminal of the eighth resistor is configured as the high-potential terminal of the main control circuit; a seventh input/output pin and an eighth input/output pin of the main control chip are configured as the clock output terminal and the data output terminal of the main control circuit respectively; a tenth input/output pin and a ninth input/output pin of the main control chip are configured as the first voltage detection terminal and the second voltage detection terminal of the main control circuit respectively; an eleventh input/output pin and a twelfth input/output pin of the main control chip are coupled to a first terminal of the ninth resistor and a first terminal of the tenth resistor respectively; a first terminal of the eleventh resistor and a first terminal of the twelfth resistor are coupled to a second terminal of the ninth resistor and a second terminal of the tenth resistor respectively; a second terminal of the eleventh resistor and a second terminal of the twelfth resistor are jointly grounded; a first terminal of the thirteenth resistor and a first terminal of the fourteenth resistor are coupled to the second terminal of the ninth resistor and the second terminal of the tenth resistor respectively; a second terminal of the thirteenth resistor and a second terminal of the fourteenth resistor are jointly coupled to the power pin of the main control chip; and the second terminal of the ninth resistor and the second terminal of the tenth resistor are configured as the first communication terminal and the second communication terminal of the main control circuit respectively.

12. The electronic device of claim 8, wherein, the potential regulation circuit comprises: a fifteenth resistor, a sixteenth resistor, a digital potentiometer, a seventeenth resistor, an eighteenth resistor, a fifth capacitor, a sixth capacitor and a nineteenth resistor;

a junction of a first terminal of the fifteenth resistor, a first terminal of the sixteenth resistor, a power pin of the digital potentiometer and a first terminal of the fifth capacitor is configured as the power terminal of the potential regulation circuit; a second terminal of the fifth capacitor, a first terminal of the sixth capacitor, a ground pin of the digital potentiometer and a first terminal of the seventeenth resistor are jointly grounded; a second terminal of the sixth capacitor is coupled to the power pin of the digital potentiometer; a junction of a second terminal of the fifteenth resistor and a serial data pin of the digital potentiometer is configured as the data input terminal of the potential regulation circuit; a junction of a second terminal of the sixteenth resistor and a clock input pin of the digital potentiometer is configured as the clock input terminal of the potential regulation circuit; an address zero pin of the digital potentiometer is grounded; a first potential wiring pin of the digital potentiometer and a first terminal of the eighteenth resistor are jointly coupled to a second terminal of the seventeenth resistor; a second terminal of the eighteenth resistor and a second potential wiring pin of the digital potentiometer are jointly coupled to a first terminal of the nineteenth resistor; a second terminal of the nineteenth resistor is configured as the high-potential terminal of the potential regulation circuit; and a potential tap pin of the digital potentiometer is configured as the potential regulation terminal of the potential regulation circuit.

13. The electronic device of claim 8, wherein, the current detection circuit comprises: a twentieth resistor, a twenty-first resistor, a twenty-second resistor, a seventh capacitor, an eighth capacitor, a current detection chip, a twenty-third resistor, a ninth capacitor, a tenth capacitor and a twenty-fourth resistor;

a first terminal and a second terminal of the twentieth resistor are configured as the direct current input terminal and the direct current output terminal of the current detection circuit respectively; a first terminal of the twenty-first resistor and a first terminal of the twenty-second resistor are coupled to a first terminal and a second terminal of the twentieth resistor respectively; a second terminal of the twenty-first resistor and a first terminal of the seventh capacitor are jointly coupled to a positive input pin of the current detection chip; a second terminal of the twenty-second resistor and a first terminal of the eighth capacitor are jointly coupled to a negative input pin of the current detection chip; a junction of a power pin of the current detection chip and a first terminal of the ninth capacitor is configured as the power terminal of the current detection circuit; a vacant pin of the current detection chip is suspended; an output pin of current detection chip is coupled to a first terminal of the twenty-third resistor; a second terminal of the twenty-third resistor is configured as the current detection feedback terminal of the current detection circuit; a first terminal of the tenth capacitor and a first terminal of the twenty-fourth resistor are jointly coupled to a second terminal of the twenty-third resistor; a second terminal of the seventh capacitor, a second terminal of the eighth capacitor, a second terminal of the ninth capacitor, a second terminal of the tenth capacitor, a second terminal of the twenty-fourth resistor, and a ground pin, a first reference voltage pin and a second reference voltage pin of the current detection chip are jointly grounded.

14. The electronic device of claim 8, wherein, the voltage detection circuit comprises: a twenty-fifth resistor, a twenty-sixth resistor, an eleventh capacitor, a twelfth capacitor, a twenty-seventh resistor and a twenty-eighth resistor;

a first terminal of the twenty-fifth resistor is configured as the first detection terminal of the voltage detection circuit; a junction of a second terminal of the twenty-fifth resistor, a first terminal of the twenty-sixth resistor and a first terminal of the eleventh capacitor is configured as the second output terminal of the voltage detection circuit; a second terminal of the twenty-sixth resistor is configured as the second detection terminal of the voltage detection circuit; a second terminal of the eleventh capacitor, a first terminal of the twelfth capacitor and a first terminal of the twenty-seventh resistor are jointly coupled to a second terminal of the twenty-sixth resistor; a junction of a second terminal of the twelfth capacitor, a second terminal of the twenty-seventh resistor and a first terminal of the twenty-eighth resistor is configured as the first output terminal of the voltage detection circuit; and a second terminal of the twenty-eighth resistor is configured as the third detection terminal of the voltage detection circuit.

15. The electronic device of claim 8, wherein, the output switch circuit comprises: a twenty-ninth resistor, a thirtieth resistor, a thirteenth capacitor, a thirty-first resistor, a first NPN triode, a thirty-second resistor, a second NPN triode, a third diode, a voltage stabilizing diode, a thirty-third resistor, a thirty-fourth resistor, a thirty-fifth resistor, a second NMOS transistor and a third NMOS transistor;

a first terminal of the twenty-ninth resistor is configured as the controlled terminal of the output switch circuit; a second terminal of the twenty-ninth resistor and a first terminal of the thirtieth resistor are jointly coupled to a base electrode of the first NPN triode; a first terminal of the thirteenth capacitor, a first terminal of the thirty-first resistor and a first terminal of the thirty-second resistor are jointly coupled to a cathode of the third diode; an anode of the third diode is configured as the power terminal of the output switch circuit; a second terminal of the thirty-first resistor and a base electrode of the second NPN triode are jointly coupled to a collector electrode of the first NPN triode; a second terminal of the thirty-second resistor, a cathode of the voltage stabilizing diode and a first terminal of the thirty-third resistor are jointly coupled to a collector electrode of the second NPN triode; a second terminal of the thirtieth resistor, a second terminal of the thirteenth capacitor, an emitter electrode of the first NPN triode, an emitter electrode of the second NPN triode and an anode of the voltage stabilizing diode are jointly grounded; a second terminal of the thirty-third resistor, a first terminal of the thirty-fourth resistor, a first terminal of the thirty-fifth resistor, a gate electrode of the second NMOS transistor and a gate electrode of the third NMOS transistor are jointly grounded; a second terminal of the thirty-fourth resistor is configured as the ground terminal of the output switch circuit; a drain electrode of the second NMOS transistor is configured as the input terminal of the output switch circuit; a source electrode of the second NMOS transistor and a second terminal of the thirty-fifth resistor are jointly coupled to a source electrode of the third NMOS transistor; and a drain electrode of the third NMOS transistor is configured as the output terminal of the output switch circuit.

16. The electronic device of claim 8, wherein, the charging control circuit comprises a battery connector, a main controller, a thirteenth capacitor, a thirty-sixth resistor, a thirty-seventh resistor, a fourteenth capacitor, a first Schottky diode, a second Schottky diode, a fifteenth capacitor, a thirty-eighth resistor, a thirty-ninth resistor, a fortieth resistor, a third NPN triode, a fourth NMOS transistor and a fifth NMOS transistor;

the battery connector is coupled to an electrode of the battery; a first pin and a second pin of the battery connector are jointly grounded; a first ground pin and a second ground pin of the battery connector are jointly grounded; a first input/output pin of the main controller is coupled to a seventh pin and an eighth pin of the battery connector; a second input/output pin, a seventh input/output pin, an eighth input/output pin and a ninth input/output pin of the main controller are coupled to a sixth pin, a fifth pin, a fourth pin and a third pin of the battery connector respectively; an analog ground pin and a ground pin of the main controller are both grounded; a first vacant pin and a second vacant pin of the main controller are suspended; a power pin of the main controller and a first terminal of the thirteenth capacitor are both coupled to the seventh pin and the eighth pin of the battery connector; a fourth input/output pin and an eleventh input/output pin of the main controller are configured to perform data communication with the electronic device; the thirty-sixth resistor is coupled between the fourth input/output pin and the power pin of the main controller; the sixth input/output pin and the twelfth input/output pin of the main controller are coupled to a first communication terminal and a second communication terminal of the main control circuit in the power adapter respectively; a first terminal of the thirty-seventh resistor and a first terminal of the thirty-eighth resistor are jointly coupled to a tenth input/output terminal of the main controller; a second terminal of the thirty-seventh resistor is coupled to the power pin of the main controller; a second terminal of the thirty-eighth resistor is coupled to a base electrode of the third NPN triode; a fifth input/output terminal of the main controller is coupled to a first terminal of the fourteenth capacitor; a second terminal of the fourteenth capacitor and a cathode of the first Schottky diode are jointly coupled to an anode of the second Schottky diode; a first terminal of the thirty-ninth resistor and a first terminal of the fifteenth capacitor are jointly coupled to a cathode of the second Schottky diode; each of a second terminal of the thirty-ninth resistor, a first terminal of the fortieth resistor and a collector electrode of the third NPN triode is coupled to a gate electrode of the fourth NMOS transistor and a gate electrode of the fifth NMOS transistor; a second terminal of the fortieth resistor and a second terminal of the fifteenth capacitor are jointly grounded; a source electrode of the fourth NMOS transistor is coupled to an anode of the first Schottky diode, and also coupled to a seventh pin and an eighth pin of the battery connector; a drain electrode of the fourth NMOS transistor is coupled to a drain electrode of the fifth NMOS transistor; a source electrode of the fifth NMOS transistor is coupled to the communication interface of the electronic device; an emitter electrode of the third NPN triode is coupled to an anode of the third Schottky diode, and a cathode of the third Schottky diode is grounded.

\* \* \* \* \*